No. 660,549. Patented Oct. 30, 1900.
O. V. BACHELLÉ.
BRAKE FOR VEHICLES.
(Application filed Oct. 2, 1899.)
(No Model.) 2 Sheets—Sheet 1.
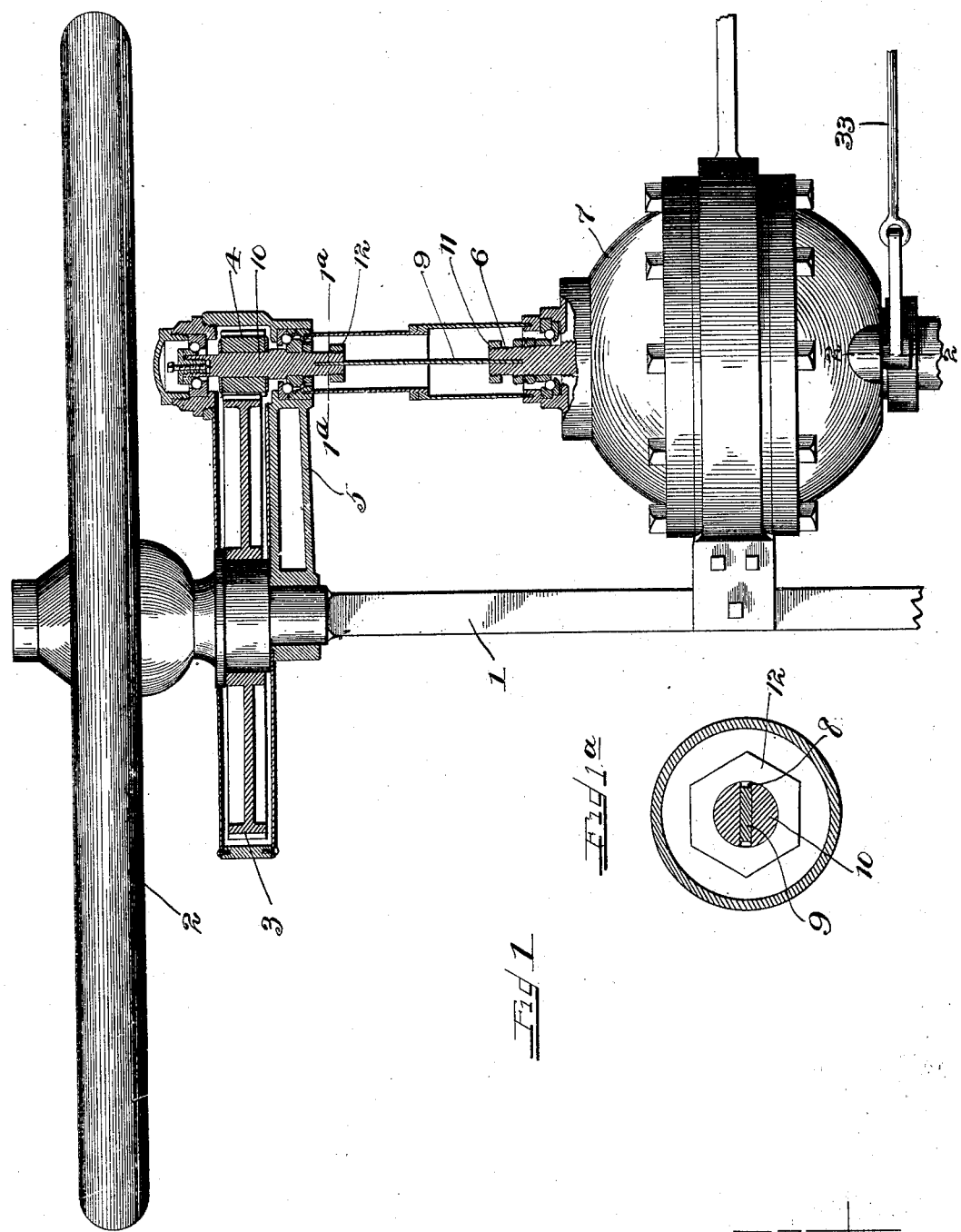

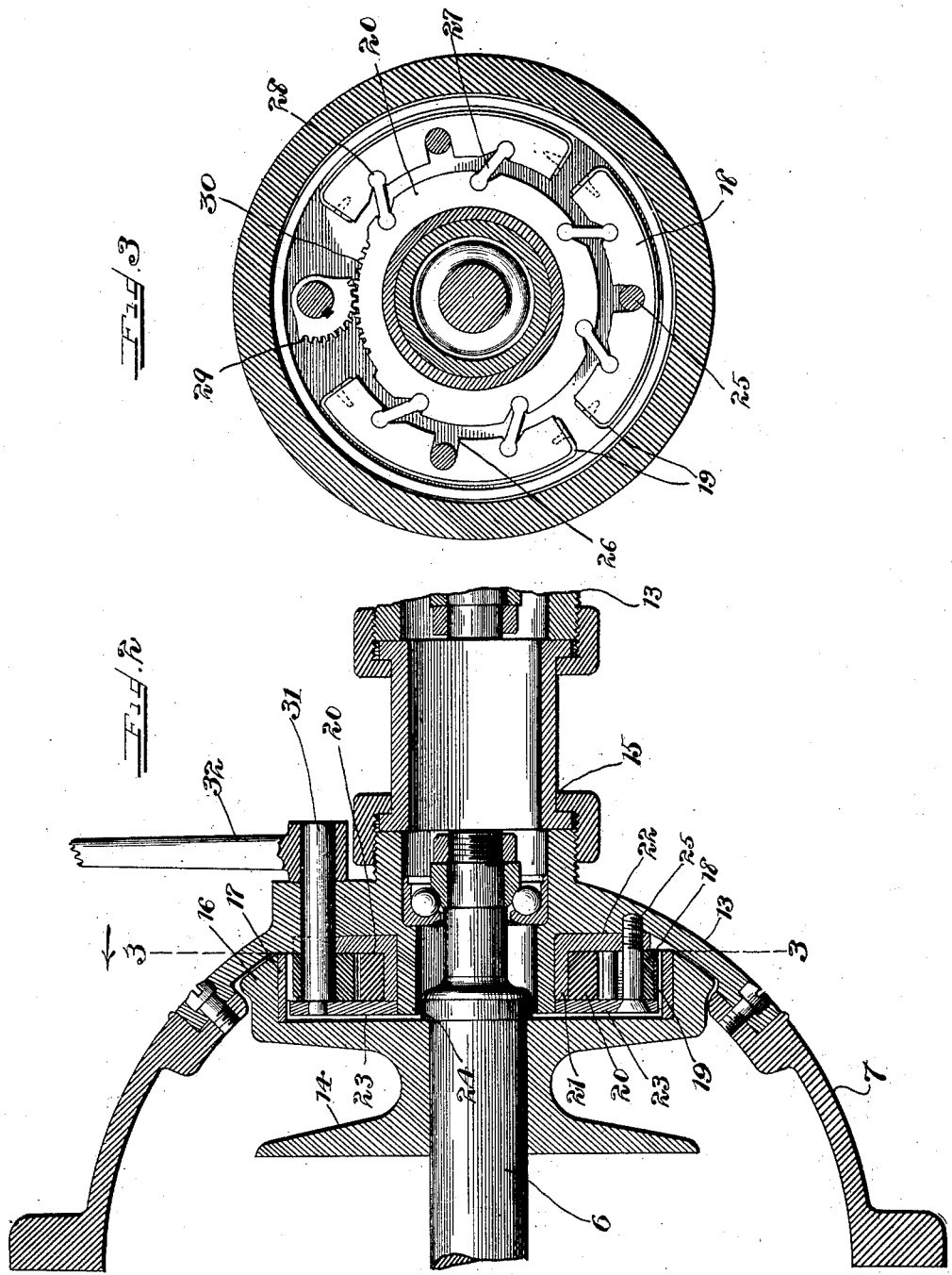

UNITED STATES PATENT OFFICE.

OTTO V. BACHELLÉ, OF CHICAGO, ILLINOIS.

BRAKE FOR VEHICLES.

SPECIFICATION forming part of Letters Patent No. 660,549, dated October 30, 1900.

Application filed October 2, 1899. Serial No. 732,293. (No model.)

*To all whom it may concern:*

Be it known that I, OTTO V. BACHELLÉ, a citizen of the United States, residing at No. 1367 Sheffield avenue, in the city of Chicago, county of Cook, and State of Illinois, have invented certain new and useful Improvements in Brakes for Vehicles, &c., of which the following is a full, clear, and exact specification.

My invention relates more particularly to brakes for automobiles or motor-vehicles of all descriptions; but it is neverthless applicable to a brake generally.

My invention has for its primary object to provide a brake for machinery where there are driving and driven members which will allow one of such members to continue its motion in a slight degree after the brake has completely arrested the other member, whereby the great shock and strain on the mechanism heretofore resulting from a sudden application of the brake will be avoided.

More specifically stated, the object of my invention in this regard is to provide a flexible connection between the wheel to be arrested and the revolving member to which the brake is applied, whereby the wheel may rotate a slight degree after the former member ceases to move.

Another object of my invention is to provide a powerful brake especially applicable to automobiles which shall be simple of construction and operation.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

In the said drawings, Figure 1 is a plan view of an automobile-wheel and the motor for driving the same provided with my improvements, certain portions being shown in section. Fig. 1ª is a cross-section of the plate 9 and its inclosing sleeve, drawn to an enlarged scale. Fig. 2 is an enlarged vertical sectional view taken on the line 2 2, Fig. 1; and Fig. 3 is a transverse sectional view taken on the line 3 3, Fig. 2.

In illustrating my invention I have shown it in connection with the driver of an automobile as an illustration of its greatest field of usefulness, and this automobile is of the electrical type; but it will nevertheless be understood that any other motor may be substituted for the electric motor shown without departing from my invention in its broad sense.

1 represents the axle of the vehicle or automobile, having a driver 2 journaled loosely thereon and secured to a gear-wheel 3, which latter meshes with a pinion 4, journaled in an arm 5, rigidly secured to the axle 1, and 6 represents the axle or spindle of an electric motor, preferably incased in a shell 7, the armature and winding being omitted. One end of the motor-shaft 6 is provided with a slot 8, in which is inserted one end of a flexible connection in the form of a flat elastic blade 9, whose other end is inserted in a similar slot in one end of a short shaft 10, upon which the pinion 4 is secured, thus providing the motor with means for communicating its motion to the pinion 4, while at the same time allowing of a slight degree of independent rotation of both the pinion and motor and also allowing the motor-shaft to vibrate or oscillate independently of the pinion-shaft, if necessary. The ends of the blade 9 are held against lateral displacement by means of collars 11 12, threaded over the ends of the shafts 6 10, respectively, and the blade is slightly less in width than the diameter of the shafts 6 10, so that the motor-shaft may oscillate in a slight degree in the plane of the blade, if necessary.

One side of the shell 7 is provided with a removable cap 13, which is preferably of sufficient diameter to admit the hub 14 of the motor, and in this cap 13 are mounted the antifriction-bearings of the shaft 6 at the end opposite that disclosed in Fig. 1, as clearly shown in Fig. 2. Where two motors are employed, the caps 13 on the opposed sides of the shell 7 are connected together by a union 15, so as to completely close the outer end of each cap 13 and render the shell 7 dust-proof.

In providing an electric automobile with my improved brake I prefer to apply the brake to the motor-shaft or, more specifically speaking, to its hub. When the hub 14 is constructed of comparatively soft material, I face the same where the brake is applied with steel or equivalent material. In the example of my invention shown more clearly in Figs. 2 and 3 of the drawings the outer side of the hub 14 is provided with a salient flange or resistance-band 16, in which is forced a steel ring 17, forming a contact for the brake-shoes. These shoes are shown at 18 and are preferably three in number, each circular on its exterior and arranged one after the other around the interior of the ring 17, as better shown in Fig. 3, so as to leave slight spaces between their ends, the surfaces of the shoes, if desired, being equipped with strips 19 of some suitable material for receiving the wear. Arranged concentrically within the circle described by the shoes 18 is a revoluble ring 20, which is journaled on a collar or bushing 21 and flanked by two flanges. One of these flanges is shown at 22 and is preferably formed on the collar or bushing 21, while the other is in the form of an annular plate 23, sleeved over an annular flange 24, formed on the inner side of the cap 13 and serving also to sustain the bushing 21, against which the flange 23 abuts. These flanges 22 23 are tied together and firmly held against rotation by means of a number of screw-bolts 25, which pass through both of said flanges and are threaded in the shell 13, as better shown in Fig. 2, and said screws also pass through notches 26, formed in the inner edge of each of the shoes 18, whereby the shoes 18 will be held against rotary movement while permitted to move in a radial direction, it being understood, of course, that the shoes 18 are likewise flanked by the two flanges 22 23. Arranged between each of the shoes 18 and the periphery of the ring 20 are a number of wedging levers or arms 27, whose ends are provided with circular heads 28, seated in circular sockets in the ring 20 and shoes 18, respectively, the sockets being formed to embrace more than a half-circle of each of the heads, so as to prevent dislodgment of the levers or arms 27, which latter are of greater length than the distance between the socket in the ring and the socket in the shoe and are arranged in an oblique or tangential position, so that when the ring is rotated with reference to the shoes the wedges or levers 27 will tend to straighten out into a radial position with reference to the axis of the ring, and thereby force the shoes firmly against the steel ring or band 17 with great pressure, the shoes being held against rotary movement with the ring by the stops 25. This relative movement of the ring 20 is effected by means of a toothed segment 29, arranged between the flanges 22 23 and meshing with a segment-rack 30, formed on the periphery of the ring 20, the segment 29 being keyed or otherwise secured to a short shaft 31, journaled in the cap 13 and flange 23 and having an operating-lever 32 on its exterior for the attachment of any suitable connection 33 for applying the brake from a distance. By this means it will be seen that I locate the brake wholly within the motor-shell, entirely excluded from dust and moisture, with capability at the same time of being readily removed for repairs.

Having thus described my invention, what I claim as new therein, and desire to secure by Letters Patent, is—

1. A brake mechanism for the purpose described having in combination a recessed or flanged hub, circular brake-shoes arranged within the recess or flange of said hub and adapted to impinge thereagainst, a ring around which said brake-shoes are arranged, wedging arms arranged between said brake-shoes and ring, means for holding said brake-shoes against rotation with said ring and means for rotating said ring relatively to said brake-shoes, substantially as set forth.

2. A brake mechanism for the purpose described having in combination a recessed or flanged hub on the member to be arrested, circular brake-shoes arranged within said recess or flange and adapted to impinge thereagainst, a ring around which said brake-shoes are located, wedging arms or levers arranged between said ring and brake-shoes, means for holding said brake-shoes against rotation with said ring, a segment having toothed connection with said ring for rotating it and flanges flanking said segment-ring and brake-shoes for holding them in place in said recessed hub, substantially as set forth.

3. A brake mechanism for the purpose described having in combination a flanged or recessed hub on the member to be arrested, the cap 13 in which said hub is journaled, having the flange 24, a bushing sleeved on said flange, a ring surrounding said bushing, the flanges 22 23 also surrounding said bushing, brake-shoes arranged between said flanges 22 23 and adapted to impinge against the flange of said hub, a ring arranged around said bushing between said flanges 22 23 and around which ring said shoes are located, wedging devices arranged between said shoes and ring, for rotating said ring independently of said shoes, and bolts or stops passing through said flanges 22 23 and also through said shoes for holding the latter against rotation, substantially as set forth.

4. A brake mechanism for the purpose described having in combination a flanged or recessed hub on the member to be arrested, the cap 13 in which said hub is journaled, an outwardly-movable brake-shoe supported on and carried by said cap and adapted to impinge the flange of said hub, a shaft journaled in said cap and carrying means for effecting the movement of said brake-shoe and means for rotating said shaft, substantially as set forth.

5. In a brake mechanism for the purpose described, a motor, driving-wheels and means for quickly checking the rotation of the motor in combination with means for imparting the motion of the motor to the drivers and permitting of a limited independent rotation of the drivers with a gradually-decreasing speed, substantially as set forth.

6. In a brake mechanism for the purpose described the combination of a hub having a flange or resistance-band, a member 24 independent of said hub and projecting into said band, a rotary member journaled around said member 24, brake-shoes arranged between said rotary member and band, inclined wedging arms arranged between said shoes and rotary member and means for rotating said rotary member relatively to said shoes, substantially as set forth.

7. In a brake mechanism for the purpose described the combination of a plurality of brake-shoes, a rotary member around which said brake-shoes are arranged, having teeth, wedging arms between said shoes and rotary member, a toothed segment engaging said teeth on the rotary member, a rocker-shaft for operating said segment and flanking-plates between which said shoes, rotary member and said segment are arranged and held and in which plates said shaft is journaled, said shoes, rotary member and segment being arranged in the same perpendicular plane, substantially as set forth.

8. In a brake mechanism for the purpose described the combination of a hub having a resistance-band, a brake-shoe fixed against rotation with said band, a rotary member between which and said band said shoe is located, wedging arms interposed between said shoe and rotary member and means for rotating said rotary member relatively to said shoe, substantially as set forth.

9. In a brake mechanism for the purpose described the combination of a hub having a resistance-band, a member in which said hub is journaled having the inwardly-projecting flange 24, a ring journaled around said flange 24, a brake-shoe interposed between said ring and band, wedging arms interposed between said brake-shoe and ring, a rocker-shaft journaled in said member and means on said shaft for rotating said ring relatively to said shoe, said member being fixed against rotation with said hub, substantially as set forth.

OTTO V. BACHELLÉ.

Witnesses:
F. A. HOPKINS,
EDNA B. JOHNSON.